J. G. AARTS.
FURNACE.
APPLICATION FILED AUG. 11, 1916.
1,352,338.
Patented Sept. 7, 1920.
3 SHEETS—SHEET 1.
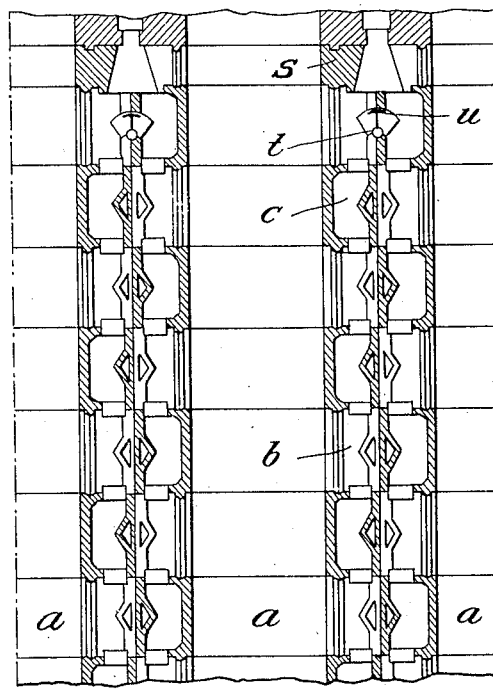
Fig. 1.
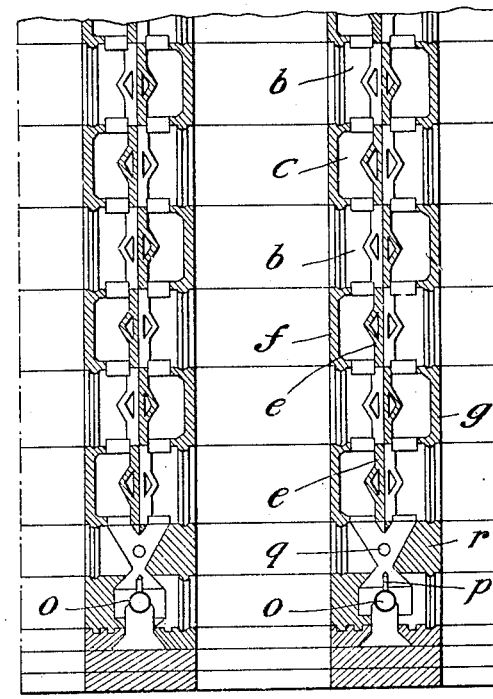
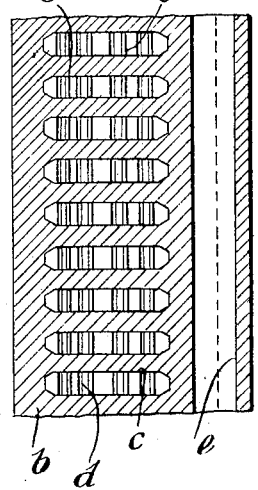
Fig. 1ᴬ.
Inventor
Jacobus G. Aarts

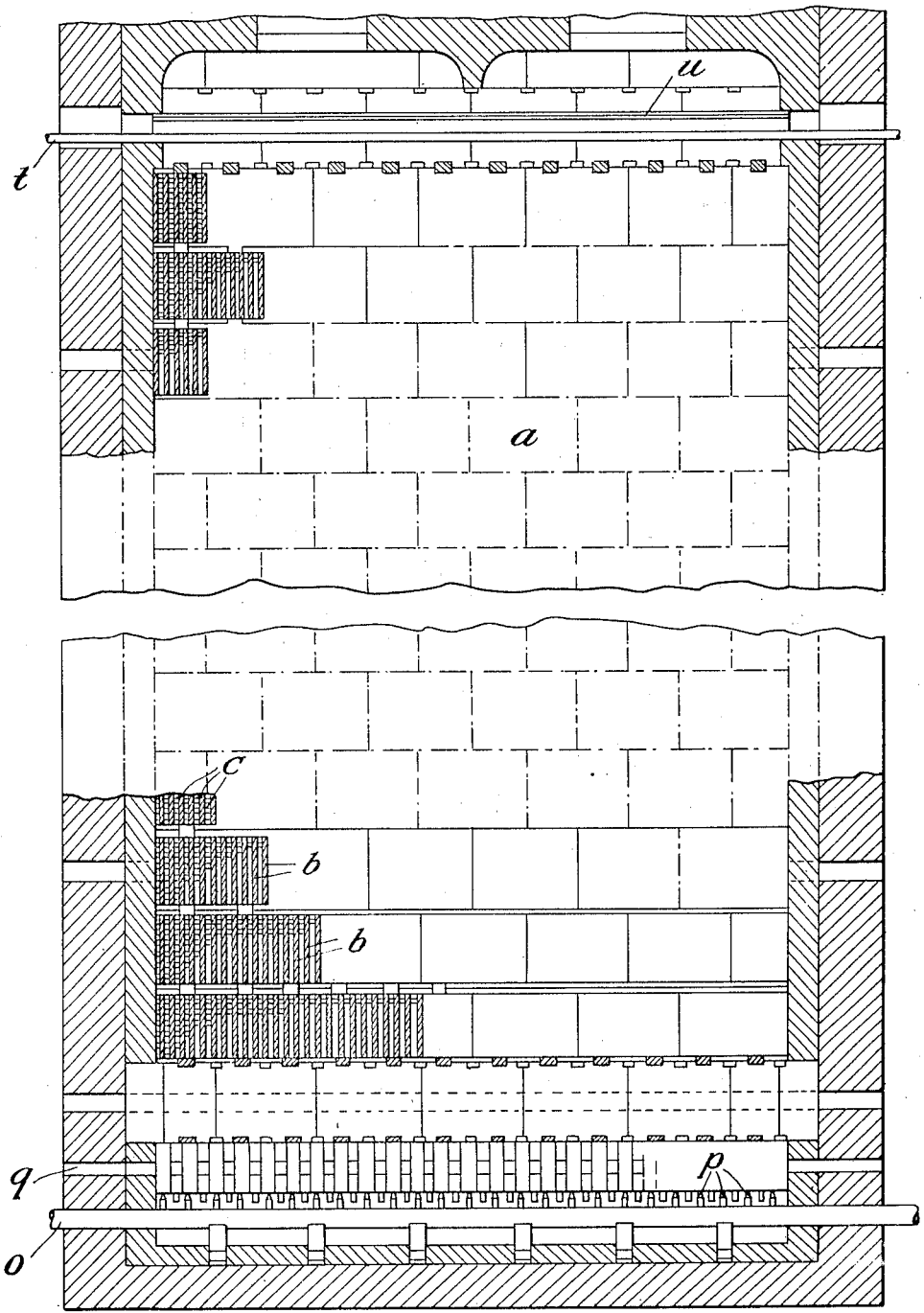

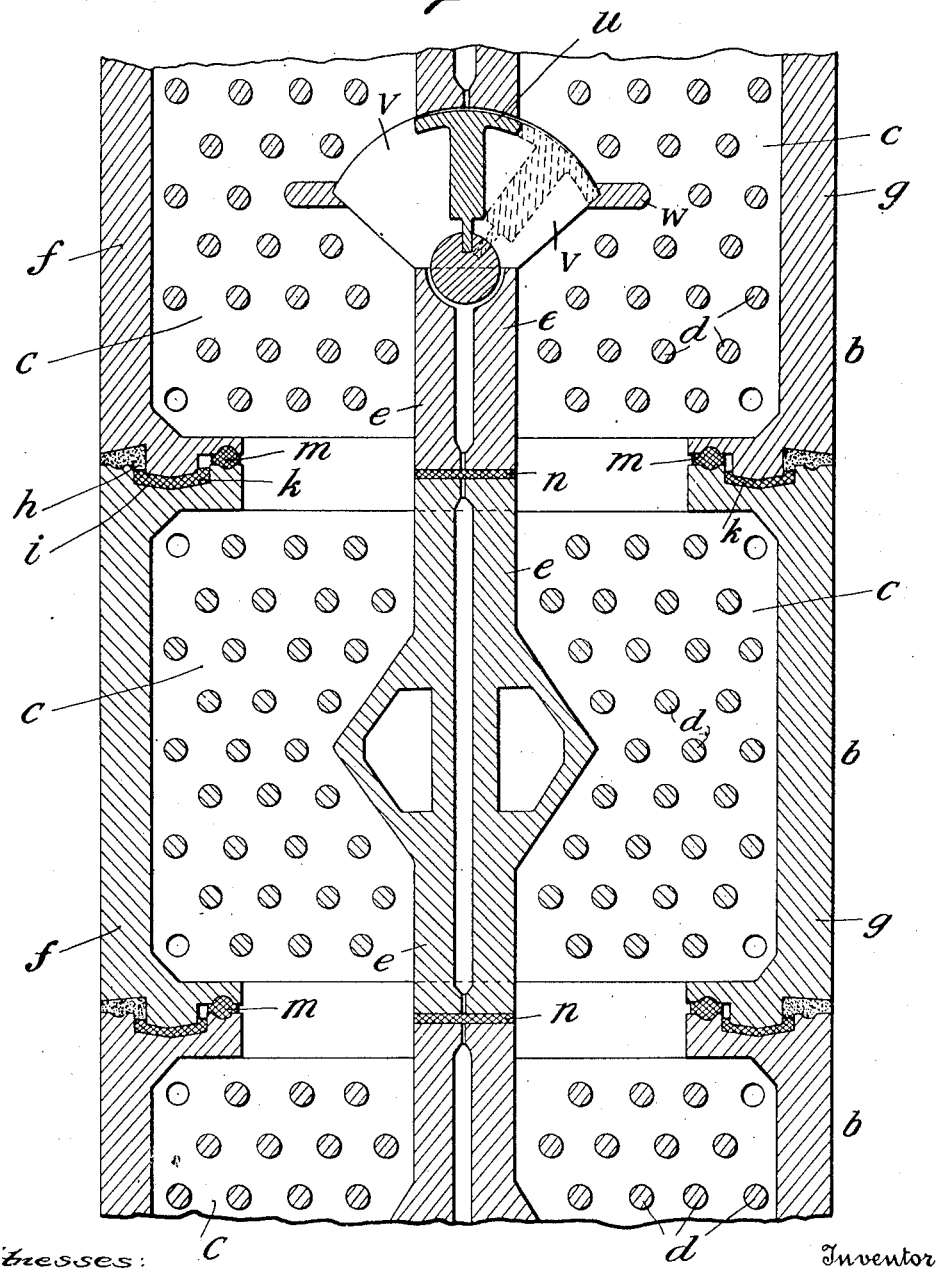

UNITED STATES PATENT OFFICE.

JACOBUS GERARDUS AARTS, OF DONGEN, NEAR BREDA, NETHERLANDS.

FURNACE.

1,352,338.  Specification of Letters Patent.  Patented Sept. 7, 1920.

Application filed August 11, 1916. Serial No. 114,485.

*To all whom it may concern:*

Be it known that I, JACOBUS GERARDUS AARTS, subject of the Queen of the Netherlands, residing at Dongen, near Breda, Netherlands, have invented certain new and useful Improvements in Furnaces, of which the following is a specification.

This invention relates to furnaces, particularly such as have vertical chambers or retorts. The object of the invention is to secure a more rapid transmission of heat to the furnace charge and a better utilization of the heat than has hitherto been achieved.

According to the invention the walls of the chamber or retort to be heated are constructed as a reservoir of heat, which in each horizontal plane has a higher capacity for heat and a greater thermal conductivity than the furnace charge. The walls which serve as heat reservoir therefor are to have in respect of configuration and properties, in each horizontal plane of the furnace, a pre-determined proportion of the dimensions and properties of the furnace charge, particularly to the mass, specific heat and thermal conductivity of the charge. For fulfilling these three requirements, the walls are of such dimensions that the mass capable of absorbing heat is larger than the mass of the charge in the same horizontal plane of the furnace. The walls are constructed of material which has a specific heat at least approximately equal to that of the charge.

In coking coal for example, suitable materials for the bricks of the coking chamber are silicon carbid, chromite, graphite or the like. These materials are used alone or admixed, and highly refractory clay may serve as mortar. By using a suitably high content of carbon or silicon carbid, both of which have a high thermal conductivity, and by using building material of high density, the said material may have a higher thermal conductivity than the charge in the same horizontal plane; that is to say the thermal conductivity of the material from which the chamber is constructed may have from twice to five times the conductivity of materials usually employed in building furnaces.

When carbon (graphite) is added to the building material its oxidization by the hot gases may be prevented by covering the surfaces which come in contact with these gases with a mixture consisting of refractory materials containing no oxidizable constituents.

The chamber walls thus constructed contain at the same temperature as that of the charge a higher quantity of heat in the same horizontal plane than is attained by the charge and the walls when heated by hot gases or the like serve as a reservoir of heat which transmits the heat more quickly to the charge, than is the case in the usual construction of heating walls. Moreover, the heat supplied is better used so that fuel is saved. In particular, the quality of the coke produced is improved, since this quality is the better the shorter the time in which the coal is carbonized. For example, by this more rapid transmission of heat, a dense coke in pieces of satisfactory size can be made from coal having less than 18-20 per cent. of volatile constituents. In the usual gradual coking operation such a coal under the same conditions of temperature would not yield a coherent coke but merely coke breeze.

The heat content of the heating wall is further favorably influenced by the fact that the silicon carbid or chromite used in making the bricks has a considerably higher specific gravity than the refractory building materials such as clay commonly used in furnace construction, so that the weight of the heating wall per unit volume is greater than heretofore whereby the heat contained in the same horizontal plane rises considerably above that of the charge.

The high heat capacity of the chamber walls is further increased according to the invention by constructing the walls of a large number of narrow heating flues. The heat absorbing surface of the bricks of which the wall is composed is in this manner essentially increased as compared with that of the bricks hitherto used which have a comparatively large hollow space, so that the proportion of the heat absorbing surface of the bricks to the heat imparting surface of the bricks, which form the inner chamber wall, is favorably affected. By suitably subdividing the heating flues this proportion may be made so great that the heat absorbing surface of the bricks may be as much as ten times as great as the heat imparting surface. At the same time, in proportion to the space which they contain, the bricks have a greater mass so that the breadth of the chamber wall becomes less when the said conditions are fulfilled.

Owing to the many small heating flues the bricks acquire a high resistance to penetration of heating gases so that there is a more localized, and, therefore, more effective heating of the bricks than is the case with the usual hollow bricks. The localization of the heating can also be increased by increasing the resistance of the bricks by means of a large number of baffles arranged in the heating flues transversely to the direction of the current of heating gas; when gas mixture is being used as the heating medium these baffles insure an improved intermixture of the heating gas with the air.

The transmission of heat from the heat reservoir to the charge is obviously more rapid the higher the temperature of the reservoir as compared with that of the charge. The chamber wall, therefore, is heated by gas or a gas mixture advantageously previously enriched with air, the excess of air being so small that there is practically no more than is essential for complete combustion. By operating in this manner the chamber wall may attain a temperature so much higher than that of the charge that when the temperature of the latter is highest, that is to say when there is the smallest difference of temperature between the heat reservoir and the charge, this difference always amounts to some 300° C.

In this mode of heating wherein the chamber wall attains an essentially higher temperature than the charge in the same horizontal plane of the furnace the higher specific heat of the constructional material has a particular importance. As is known, the specific heat of a body increases with its temperature. For carbon (graphite) for example, the specific heat at 200° C. is 0.2. At 1200° C. the specific heat is 0.415.

If the heating wall of a coke oven is constructed of materials having a lower specific heat than carbon, as is the case for instance with the clay ores hitherto usual, the specific heat of which is only about ½ that of carbon, the heat capacity of the chamber walls compared with that of the charge of coal in the coking chamber is the smaller the higher the temperature in the same horizontal plane of the furnace, since the specific heat of clay does not rise so quickly as that of carbon. Since the specific heat of the heating wall and the specific heat of the carbon as the temperature rises increase to about the same degree, and since in each horizontal plane the mass on the one hand and the temperature of the heat reservoir on the other hand is greater than the mass and the temperature of the charge of coal, the heat capacity of the heating medium (the chamber wall constructed as a heat reservoir) is always considerably greater (up to over three times) than the mass of carbon to be heated in the same plane of the furnace, and indeed at each temperature.

The heat capacity of the chamber walls may be adapted to the temperatures prevailing in the several horizontal planes by arranging that a correspondingly larger proportion of the material (such as silicon carbid or carbon) which increases the conductivity shall be added to the building material used for constructing the walls, or a larger proportion of the materials (such as chromite or clay) which diminish the conductivity.

This mode of heating produces very satisfactory results when applied to continuously operating carbonizing and reduction furnaces having vertical chambers in which the charge moves in counter-current to the rising heating gases for the purpose of being heated gradually. In this mode of working the first heating zone (maximum zone) is at the lower part of the heating wall, where the charge to be carbonized or reduced has its highest temperature, namely about 1200° C. By using the mode of heating according to the invention, the heating wall may attain a temperature of 1500° C. and over in that horizontal plane of the furnace in which the charge has the temperature of 1200° C. so that the difference of temperature between wall and charge at this place is 300° C.

With this initial temperature difference of about 300° C. for the external heating and a gradation of this temperature such that the heating wall at the exit for the gases at the upper end of the shaft is about 500° C. or even less, there is rendered possible in each horizontal plane of the furnace a temperature difference of about 300° C. between the heat reservoir and the charge, provided that the speed of the descending charge has a certain relationship to the external heating.

The efficiency of a furnace in which the charge is subjected to a graded heating in the aforesaid manner can be still further enhanced by insulating from each other the several graded temperature zones of the chamber wall by means of materials which are poor conductors of heat. Any considerable exchange of heat between the several zones is thus avoided and the heat stored in the bricks constituting the zone must be transmitted horizontally to the charge. A suitable insulating material for the purpose is asbestos or the construction may be such that layers of air or gas serve as insulation.

The heat of the heating gases may be better utilized by increasing the transmission to the charge by radiation; for this purpose the internal face of the chamber wall may have a capacity for radiation higher than that of the rest of the wall.

For instance the surface of the bricks which is to constitute the inner face of the wall may have embedded in it a material of greater hardness than that of the charge, preferably material in the form of crystals. In this manner the inner face of the wall becomes a large number of small projections by which the effective surface, as compared with the linear dimensions of the wall, is essentially increased and with it the radiation. The material forming the projections should be harder than the charge to avoid rapid abrasion of the projections. For carbonizing and reducing furnaces silicon carbid, chrome iron ore, quartz and the like of suitable size of grain are useful materials for making the projections; they may be embedded in the bricks in the course of manufacture or applied to the chamber wall after it has been built.

This particular construction of the inner surface of the wall is specially important at those parts of the furnace where the temperature exceeds 800° C., that is to say where the proportion of heat transmitted by radiation gradually increases. It is known that coke assumes at high temperatures a vesicular formation which prevents it from making satisfactory contact with the oven wall. In these high temperature zones, therefore, it is particularly valuable that the heat transmission should be as far as possible by radiation, which desideratum is attained by this invention on the one hand by a high maximum temperature and on the other hand by increasing the capacity for radiation of the inner surface of the chamber wall.

The transmission of heat from the heating wall to the charge is so much more rapid than hitherto that it becomes possible to reduce the time of carbonization under conditions otherwise similar to a very considerable extent.

In continuously operating vertical retorts in which the zone of maximum heating is at the lower part of the heating wall, as hereinbefore specified, the heating may be so controlled that the waste gases leave the topmost heat reservoir at a temperature below 400° C. and containing over 18 per cent, of carbon dioxid and under 0.5 per cent of oxygen. The heating efficiency is in this case above 85 per cent.

As a result of the more rapid heat transmission the coke produced is larger and more dense than hitherto. This is also a consequence of the high coking temperature used.

In a bench of coke ovens it may be arranged that the heat reservoir belonging to each chamber is provided by building the wall between adjacent chambers of bricks of which the heating flues, constituting the heat reservoir, are separated by a middle partition wall into two groups, the passages through which can be controlled by dampers. When the two heating groups are put into communication with each other at the lower part where the heating gases enter and also at the upper part where the heating gases escape, a damper at this latter place of each heat reservoir may control the passage to the corresponding chamber.

In the accompanying drawings is shown a construction, according to the invention, of a coke oven having vertical chambers.

Figure 1 is a vertical cross section through an oven chamber and its heating walls.

Fig. 1$^A$ is a horizontal section taken through a portion of one of the bricks shown by Fig. 3, and on a smaller scale.

Fig. 2 is a vertical longitudinal section partly in elevation through the heating chamber shown in Fig. 1.

Fig. 3 is the upper part of a heating wall as shown in Fig. 1 drawn to an enlarged scale.

The walls of the vertical chamber $a$ are constructed as heating walls and for this purpose are built of bricks $b$ which have a large number of comparatively narrow vertical channels $c$ serving as heating flues. The bricks are bonded by means of groove and feather, so that the heating flues $c$ constitute continuous flues from the bottom to the top. Within the narrow heating flues is a large number of transversely arranged bars $d$ serving as baffles. Each brick is shown as comprising two parts divided by a middle partition wall $e$ so that in each heating wall there are two heating flues $c$ running from below upward. Each heating wall, therefore, serves to heat two adjacent chambers $a$.

The heat absorbing surface of the heating flues $c$ and of the bars $d$ of each brick $b$ is about 10 times the heat imparting surface of a brick and therefore of the external surfaces of the walls $f$, $g$, which are in contact with the charge. When the oven is to be operated continuously and with graduated heating of the charge, the bricks are made of a mixture of materials which are the best possible conductors of heat, such as carbon or silicon carbid and are insulated from each other by material which is a poor conductor of heat. For this purpose, as shown in Fig. 3, in laying the bricks there is inserted between the feather $h$ of one brick and the somewhat wider groove $i$ of the adjacent brick a strip $k$ of asbestos.

Further along the inner surface of the brick between the abutting faces of adjacent bricks, there may be inserted an asbestos cord $m$ held in place by grooves in the abutting faces. The feathers $h$ are of such height that in laying the bricks there is left between them a space which is filled with refractory material. The middle partition e of the brick is also of such dimensions that in laying the bricks there is left between it and the partition of the adjacent brick a space which may be filled with a layer n of asbestos. The bricks are then so well insulated from each other that passage of heat from one brick to its neighbors through its walls is considerably hindered. Each brick therefore attains a definite temperature and the heat can only flow in the zones formed by the bricks b in horizontal planes to the charge.

The faces f, g of the bricks b, which faces constitute the inner surface of the chambers, may have embedded in them for the purpose of increasing the radiating surface crystals of the size of grain of a material of greater hardness than that of the charge, for instance silicon carbid, chrome iron stone or quartz.

The chamber wall formed of the bricks b is heated by a mixture of gas and air supplied through a pipe o to the lower part of the wall where it issues through nozzles p and draws in secondary air through channels q. The mixture enters bricks r formed like nozzles in which it is ignited and in part burnt. The heating gases then flow to both sides of the partition e through both groups of heating flues c upward in countercurrent to the descending oven charge.

Owing to the fact that the bricks are constructed as heat reservoirs, the lower zones of the heating wall, at which part the charge (coal) is to be carbonized, attain a temperature of 1500° C. and therefore the charge is heated to a temperature of 1200° C. At the upper ends of the flues where the heating gases issue through the bricks s from the heating wall, the heating zones have a temperature of about 500° C.

In the uppermost bricks b constructed as heat reservoirs there is a butterfly valve u turning on an axle t and adjustable from without; this valve is introduced into the walls of the heating flues c through openings v. In these bricks there are horizontal rods w, which serve as stops limiting the stroke of the valve. When the valve u is in the middle position, shown in full lines (Fig. 3) the heating gases pass to both sides of the partition e and travel in equal quantities through the two heating groups c. On the other hand, when the valve u is in the closing position shown in Fig. 3 by dotted lines, only so much heating gases can flow through the right hand group of heating flues as corresponds with the throttling produced by the valve. By adjusting the valve, therefore, each heating group can be controlled relatively to the progress of carbonization in the corresponding chamber.

Having thus described my invention and the best means I know for carrying the same into practical effect, I claim:—

1. A furnace of the class specified having vertical chambers, each chamber having its wall composed of bricks of a high refractory material and provided with comparatively narrow vertical channels serving as heat flues which in the series of superimposed bricks are in registration to constitute continuous flues from the bottom to the top of the furnace, whereby the resistance of the chamber wall to permeation of the heating medium and consequent local combustion is increased.

2. A furnace of the class specified having vertical chambers, the wall of each chamber being composed of bricks consisting of highly refractory material and provided with a large number of narrow heating flues and a large number of baffles arranged transversely therein to the direction of the current of the heating gases to increase the resistance of the flues to such current and produce a better intermixture of the heating gas with the air for combustion, the flues of the several bricks being in communication and forming continuous flues from the bottom to the top of the furnace.

In testimony whereof I have hereunto set my hand.

JACOBUS GERARDUS AARTS.